3,470,116
SELF-EXTINGUISHING STYRENE POLYMER COMPOSITIONS AND METHOD OF MAKING SAME
Hans Eberhard Praetzel, Bensberg-Frankenforst, and Ernst-Friedrich Wirth and Herbert Jenkner, Cologne-Deutz, Germany, assignors to Chemische Fabrik Kalk G.m.b.H., Cologne-Kalk, Germany
No Drawing. Filed Jan. 21, 1966, Ser. No. 522,047
Int. Cl. C08f 47/08, 33/08; C09k 3/28
U.S. Cl. 260—2.5                                6 Claims

ABSTRACT OF THE DISCLOSURE

Flame resistant polymer of styrene containing at least 50% by weight of styrene units, which polymer contains 0.5 to 6.0% based on the total weight of polyvinyl bromide therein as a flame-proofing agent.

---

This invention relates to styrene polymers.

Shapes made of polystyrene or of copolymers containing polystyrene could be put to many different applications in the building industry because of their suitable mechanical and physical properties. Those made of possibly foamed polystyrene or of copolymers substantially comprising polystyrene are above all distinctive in having an excellent insulating action against heat and sound and also against electricity. However, the use of shapes consisting wholly or chiefly of polystyrene in the building industry is greatly restricted because of their combustible nature.

It has been proposed to reduce the combustibility of polystyrene or styrene copolymers by including organic chlorine compounds such as chlorinated paraffins with a chlorine content of over 50% by weight, polyvinyl chloride, tetrachloroethane, tetrachlorobutane, tetrachlorobutyrolactone, hexachlorocyclopentadiene and the like; these may be used together with substances having a synergistic action such as antimony trioxide, antimony trisulphide, organic peroxides and metal complex compounds such as ferrocenes. However, the organic chlorine compounds must be present in large quantities in the polystyrene or polystyrene copolymer if adequate flame resistance is to be obtained.

However, such large quantities of additives have a considerably detrimental effect on the mechanical and physical properties of the polystyrene or polystyrene copolymers. In the case of foams in particular, the increase in the weight per unit of volume of the polymers has unfortunate results.

The use of organic bromine compounds such as 1,1,2,2-tetrabromoethane, tetrabromobutane, 1,2-dibromoethylbenzene, tetrabromocyclododecane, tetrabromo - compounds of butane diol-1,4-divinyl ether, mono, di or tribromobenzene or similar compounds has also been proposed to reduce the combustibility of polystyrene or styrene copolymers. As compared with organic chlorine compounds, organic bromine ones have the advantage that considerably smaller quantities provide the same flame protection in polystyrene or styrene copolymers. Because of the smaller quantity of organic bromine compounds added, the mechanical and physical properties of polystyrene or of a styrene copolymer are impaired correspondingly less than in the case of a polystyrene or styrene copolymer having the same flame resistance but where this is produced by organic chlorine compounds. After a period of time, however, low molecular weight halogen compounds will under normal conditions migrate from the polystyrene or styrene copolymer, thus making it combustible again.

Ways have therefore been sought to make polystyrene or styrene copolymers substantially permanently flameproof without having any disadvantageous effects on their mechanical and physical properties.

According to the invention, there is provided a flame-resistant polymer of styrene containing at least 50% by weight of styrene units, which polymer contains from 0.5 to 6.0%, based on the total weight, of polyvinyl bromide as a flame-proofing agent.

There is also provided, according to the invention, a method of making a shaped article, which comprises polymerising styrene at a high temperature, at least 50% by weight of the monomer units employed being styrene, and thermally deforming and setting the polymer formed, 0.5 to 6.0% of polyvinyl bromide, based on the total final weight, being added to the polymerisation mixture or to the polymer as a flame-proofing agent.

The preferred amount of polyvinyl bromide used is 1.0 to 5.0% by weight. Also, the invention is particularly applicable to foamed, particularly inflated, polymers.

For the production of the polymer in accordance with the invention, the forming mixtures may contain styrene as their only polymerisable component. But it is also possible to use mixtures in which the polymerisable component, apart from at least 50% by weight of styrene, comprises other organic compounds copolymerisable therewith, such as esters or nitriles of acrylic or methacrylic acid, vinyl esters or ethers, tertiary vinyl amines, vinyl carbazole, divinyl benzene, butadiene, unsaturated polyesters or similar compounds with polymerisable olefin-type double bonds.

According to the invention polyvinyl bromide is admixed into these forming mixtures or into the moulding materials produced therefrom as a flame retarding organic bromine compound.

The polyvinyl bromide may, for example, be dispersed in fluid monomeric or partially polymerised styrene, the styrene possibly being mixed with other compounds copolymerisable therewith. Instead of partially polymerised styrene, a solution of polystyrene in monomeric styrene may be used. Other common additives such as ultra violet stabilisers, plasticisers, fillers and colouring materials and possibly other components giving protection from flames such as organic phosphorus compounds may be included in these mixtures. Following the addition of polymerisation catalysts such as benzoyl peroxide, lauroyl peroxide or azodiisobutyronitrile the forming mixtures are polymerised by known methods at temperatures of from 40 to 100° C. Depending on the conditions chosen, this produces either granulates or block polymers which can be ground into granulates.

If expanding agents, for example lower hydrocarbons, such as butane or pentane, or azo compounds which decompose to form nitrogen, are added to the forming mixtures before polymerisation, then inflatable polymers will be produced and may either be in granulate form or be ground into a granulate.

The polyvinyl bromide may be applied in a thin film to the surface of already prepared, perhaps inflatable, granules consisting of polystyrene or styrene copolymers with a polystyrene content of at least 50% by weight. In many cases it is sufficient simply to mix the granules with finely powdered polyvinyl bromide. The mixing process must be carried out so that the polyvinyl bromide attaches itself to the granules as a film of powder. The polyvinyl bromide may equally well be sprayed onto the polystyrene or styrene-containing polymer granules as a suspension in readily volatile solvents such as petroleum ether, pentane, hexane, fluoro-chloro-hydrocarbons or similar liquids, the suspending agent being evaporated. It is an advantage for the solvents used for this purpose to boil at temperatures below the softening temperature of the granules to be treated.

The adhesion of the polyvinyl bromide to the surface of the possibly inflatable polystyrene or styrene copolymer granules may be improved by binders such as polyvinyl alcohol, starch paste, polyisobutylene, alkyl vinyl polyether or similar substances. These binders may be applied to the surface of the granules to be treated before the application of the polyvinyl bromide. It is also possible for them to be applied to the surface of the granules together with the polyvinyl bromide, which in that case may be suspended in a solvent. Granules to which polyvinyl bromide has already been applied may be further coated with binders.

It is obviously possible for shapes such as plates to be made directly and/or flame-proofed by the methods described above.

The possibly granulated moulding materials produced in this way must contain polyvinyl bromide in quantities of from 0.5 to 6.0% by weight, preferably 1.0 to 5.0% by weight, based on the total weight of material.

The moulding materials made by the methods described above are then processed, in a manner known per se, into shapes which are distinctive in their substantially permanent flame resistance; this is done in the thermoplastic state by means of suitable apparatus such as extruding machines or the like, the moulding materials being heated to slightly above their softening temperature. Once plastic, the materials can easily be formed into the desired shapes, in which they will set into solid articles by cooling to room temperature. If the moulding materials used are inflatable ones containing expanding agents which evaporate or decompose to form inert gases when the moulding materials are heated to above their softening temperature, foamed shapes will obviously be obtained. In order to give foamed shapes sufficient flame resistance, the moulding materials used to make them must contain polyvinyl bromide in quantities near the upper limit of the range claimed, since, because of their large surface, non-flameproof foamed shapes are more readily inflammable and burn away more rapidly than corresponding compact shapes. For this reason, the method according to the invention for producing foamed shapes will be described in the following examples in order to demonstrate the excellent effect of polyvinyl bromide as a flame-proofing component in shapes made of polystyrene or styrene copolymers. Polyvinyl bromide gives the shapes substantially permanent protection against flames as it has no migration tendencies. As even relatively small quantities of polyvinyl bromide are enough to give the shapes this protection, the mechanical and physical properties of the shapes are virtually unchanged or changed only to a negligible extent as compared with shapes not containing any polyvinyl bromide. Shapes manufactured in accordance with the invention can therefore be utilised for technical applications where the flame resistance of the shapes must be guaranteed for a long period as, for example, in the building industry.

The testing of the combustion behaviour mentioned in the examples was carried out as prescribed in ASTM 1692.

For this purpose samples 15.24 cm. long, 5.08 cm. wide and 1.27 cm. thick are sawn out of the material to be tested. The support used for these testing bars during the experiment is a 21.59 cm. long and 7.62 cm. wide gauze made of steel wire of 0.8 mm. diameter, of which a length of 1.27 cm. is bent upwards at 90° along a narrow side. The wire gauze is held at one corner of the upwardly bent narrow side and in the centre of the other narrow side, in each case by a clip. The sample is placed on the gauze so that its narrow side abuts the upwardly bent part and lies in the centre of the gauze. A Bunsen burner with a fishtail nozzle 3.4 cm. wide is placed below the upturned narrow side of the wire gauze. The distance between the gauze and the top edge of the nozzle of the burner must be 1.27 cm. and the burner must have a non-luminous gas flame 3.8 cm. high. Under these conditions the sample lying on the gauze is kept in the flame for 30 seconds and the time required to extinguish the sample after the removal of the flame is measured.

Example 1

Two parts by weight of finely divided polyvinyl bromide are dispersed in a solution of 20 parts by weight of polystyrene in a mixture of 80 parts by weight of monomeric styrene and 6 parts by weight of petroleum ether (boiling point 40° C.). Two parts by weight of lauroyl peroxide are added. Air is excluded and the mixture polymerised at 30° C. into a compact block. The block is then crushed and ground into grains about 1 mm. in diameter.

The polystyrene granulate is expanded to about 30 times its original volume by heating it in boiling water. The pre-foamed styrene polymer is poured into porous moulds and bonded into a shape by heating for a short time with steam. The shape is then left to stand for 24 hours at about 40° C. to remove the remaining expanding agents. Once the foamed shape is free of these it will be extinguished within ten seconds when tested by ASTM method 1692.

Example 2

100 parts by weight of a styrene polymer containing 7 parts by weight of pentane as an expanding agent are rolled round in a suspension of two parts by weight of polyvinyl bromide in 20 parts by weight of pentane, also containing 0.5 part by weight of polyisobutylene, and the solvent, pentane, is evaporated at room temperature. Each separate granule in the resultant polystyrene granulate is surrounded with a thin film of polyisobutylene in which the polyvinyl bromide is embedded.

The polystyrene granulate is expanded to about 30 times its original volume by heating in boiling water. The pre-foamed styrene polymer is poured into porous moulds and bonded into a shape by being heated with steam for a short time. The shape is then left for 24 hours at about 40° C. to remove the remains of the expanding agent. Once free from this agent the foamed shape will be extinguished within 5 seconds when tested by ASTM method 1692.

We claim:

1. A flame-resistant polymer of styrene containing at least 50% by weight of styrene units, which polymer contains from 0.5 to 6.0%, based on the total weight, of polyvinyl bromide as a flame-proofing agent.

2. A polymer according to claim 1, which contains from 1.0 to 5.0% by weight of the polyvinyl bromide.

3. A method of producing a shaped article which comprises polymerizing styrene, at least 50% by weight of the monomer units employed being styrene, shaping the polymer at a temperature above its softening temperature and cooling the shaped polymer to set it, 0.5 to 6.0% of polyvinyl bromide based on the total final weight being added to the polymerization mixture or to the polymer before it is shaped as a flame-proofing agent.

4. A method according to claim 3, wherein 1.0 to 5.0% by weight of the polyvinyl bromide is added.

5. A method according to claim 3, which includes the step of expanding the polymer by release of a blowing agent.

6. A self-extinguishing composition of matter comprising a polymer of styrene containing at least 50% by weight of styrene units, which polymer contains from 0.5 to 6.0% based on the total weight of a flame-proofing agent consisting essentially of polyvinyl bromide.

References Cited

UNITED STATES PATENTS 2,549,060  4/1951  Creely.
2,744,291  5/1956  Stastny et al.

MURRAY TILLMAN, Primary Examiner
M. FOELAK, Assistant Examiner

U.S. Cl. X.R.

260—17.4, 45.7, 869, 879, 881, 884, 886, 896, 899